(12) United States Patent
Arita et al.

(10) Patent No.: US 9,338,025 B2
(45) Date of Patent: May 10, 2016

(54) COMMUNICATION CONTROL DEVICE, MESSAGE TRANSMISSION METHOD, AND MESSAGE TRANSMISSION PROGRAM

(71) Applicant: YAHOO JAPAN CORPORATION, Tokyo (JP)

(72) Inventors: Norihiro Arita, Tokyo (JP); Yasushi Kokubo, Tokyo (JP); Miho Shinozaki, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 196 days.

(21) Appl. No.: 14/018,727

(22) Filed: Sep. 5, 2013

(65) Prior Publication Data

US 2014/0089429 A1 Mar. 27, 2014

(30) Foreign Application Priority Data

Sep. 24, 2012 (JP) ................................ 2012-209376

(51) Int. Cl.
*H04L 12/58* (2006.01)

(52) U.S. Cl.
CPC .............. *H04L 12/58* (2013.01); *H04L 51/28* (2013.01); *H04L 51/32* (2013.01)

(58) Field of Classification Search
CPC .......... H04L 12/58; H04L 51/28; H04L 51/32
See application file for complete search history.

(56) References Cited

U.S. PATENT DOCUMENTS

| 2004/0103162 | A1* | 5/2004 | Meister et al. ............... 709/206 |
| 2007/0011255 | A1* | 1/2007 | Miyamoto .................... 709/206 |
| 2009/0049140 | A1* | 2/2009 | Stoddard et al. ............. 709/206 |
| 2009/0319918 | A1* | 12/2009 | Affronti et al. ............... 715/753 |
| 2014/0250199 | A1* | 9/2014 | Stibel et al. .................... 709/206 |

FOREIGN PATENT DOCUMENTS

| JP | A-10-107989 | 4/1998 |
| JP | A-10-190727 | 7/1998 |
| JP | A-2002-261837 | 9/2002 |
| JP | A-2003-186804 | 7/2003 |
| JP | A-2004-15710 | 1/2004 |
| JP | A-2004-23592 | 1/2004 |
| JP | A-2004-241946 | 8/2004 |
| JP | A-2007-233711 | 9/2007 |
| JP | A-2010-74286 | 4/2010 |
| JP | A-2011-525676 | 9/2011 |

OTHER PUBLICATIONS

Office Action issued in Japanese Application No. 2012-209376 mailed Dec. 10, 2013 (with translation).

\* cited by examiner

*Primary Examiner* — Brian J Gillis
*Assistant Examiner* — Gil H. Lee
(74) *Attorney, Agent, or Firm* — Oliff PLC

(57) ABSTRACT

As described above, when a communication control device receives a message transmitted from a user terminal, the communication control device specifies a destination of the message from contents of the message, specifies a type of communication service available by a user of the specified destination, and creates a message suitable for the specified type of service. Then, the communication control device transmits the created message to the specified destination.

3 Claims, 5 Drawing Sheets

| STAFF NAME | DESTINATION ACCOUNT | SERVICE |
|---|---|---|
| YAHUU | @yahuu hanako | SERVICE t |
| MORI | mori xxxxxxx@mail.com | SERVICE m |
| TANAKA | Kengo-Tanaka | SERVICE f |
| HIRAI | piyopiyo_mari_ko | SERVICE y |
| LAURA | 080-1234-5678 | SERVICE s |
| ⋮ | ⋮ | ⋮ |

COMMUNICATION CONTROL DEVICE, MESSAGE TRANSMISSION METHOD, AND MESSAGE TRANSMISSION PROGRAM

CROSS-REFERENCE TO RELATED APPLICATIONS

The present application claims priority to and incorporates by reference the entire contents of Japanese Patent Application No. 2012-209376 filed in Japan on Sep. 24, 2012.

BACKGROUND OF THE INVENTION

1. Field of the Invention

The present invention relates to a communication control device, a message transmission method, and a message transmission program.

2. Description of the Related Art

In recent years, various kinds of social networking services (SNSs) have gained popularity. To use these services, for example, users can send messages to other accounts in the same service, write and post diaries of the users, or browse the diaries or individual information regarding users of the other accounts by acquiring individual accounts of the service and logging in the services using the individual accounts.

In such SNSs, convenience can be achieved when public communication (for example, communication within companies) can be exchanged using usually used private individual accounts. However, when the individual accounts of the SNSs are disclosed in working places, the private behaviors disclosed on the SNSs are also known to senior members or the like of the working places. Thus, disadvantages may occur.

Technologies for keeping individual accounts secret at the time of transmission of electronic mails have been known as technologies of the related art. For example, a technology has been known in which when a message in which the address of a sender is "A" and the address of a destination is "B" is transmitted to a terminal of a user who is the sender, a relay device receives the message, converts the address of the sender and the address of the destination to "A'" and "B'," respectively, and then transmits the message to a terminal of a user of the destination.

Patent Literature 1: Japanese Patent Application Laid-open No. 2003-186804

Patent Literature 2: Japanese Patent Application Laid-open No. 2004-023592

However, in the above-described technologies of the related art, there is a problem that messages may not be exchanged between users using other message communication services while mutual individual accounts are appropriately kept secret. That is, as in the above-described technology of the related art, in the technology for converting addresses and transmitting electronic mails, the electronic mails of the same protocol may not be transmitted without disclosing mutual accounts to both sides. Further, messages may not be transmitted between users using other message communication services. Therefore, messages may not be transmitted and received while individual accounts are kept secret.

SUMMARY OF THE INVENTION

It is an object of the present invention to at least partially solve the problems in the conventional technology.

According to one aspect of an embodiment of the present invention, A communication control device includes: a destination specifying unit that specifies a destination of a message transmitted from a user terminal based on contents of a text of the message, when the message is received; a specifying unit that specifies a type of communication service available by a user of the destination specified by the destination specifying unit; a creation unit that converts a format of the received message into a format suitable for the type of communication service specified by the specifying unit; and a transmission unit that transmits the message converted by the creation unit to the destination specified by the destination specifying unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a mode (hereinafter, referred to as an "embodiment") for carrying out a communication control device, a message transmission method, and a message transmission program according to the present disclosure will be described in detail with reference to the drawings. Further, the communication control device, the message transmission method, and the message transmission program according to the embodiment of the present disclosure are not limited.

First Embodiment

A first embodiment of the communication control device, the message transmission method, and the message transmission program according to the present disclosure will be described with reference to FIGS. 1 to 6

Configuration of Communication Control Device

Figure 1:
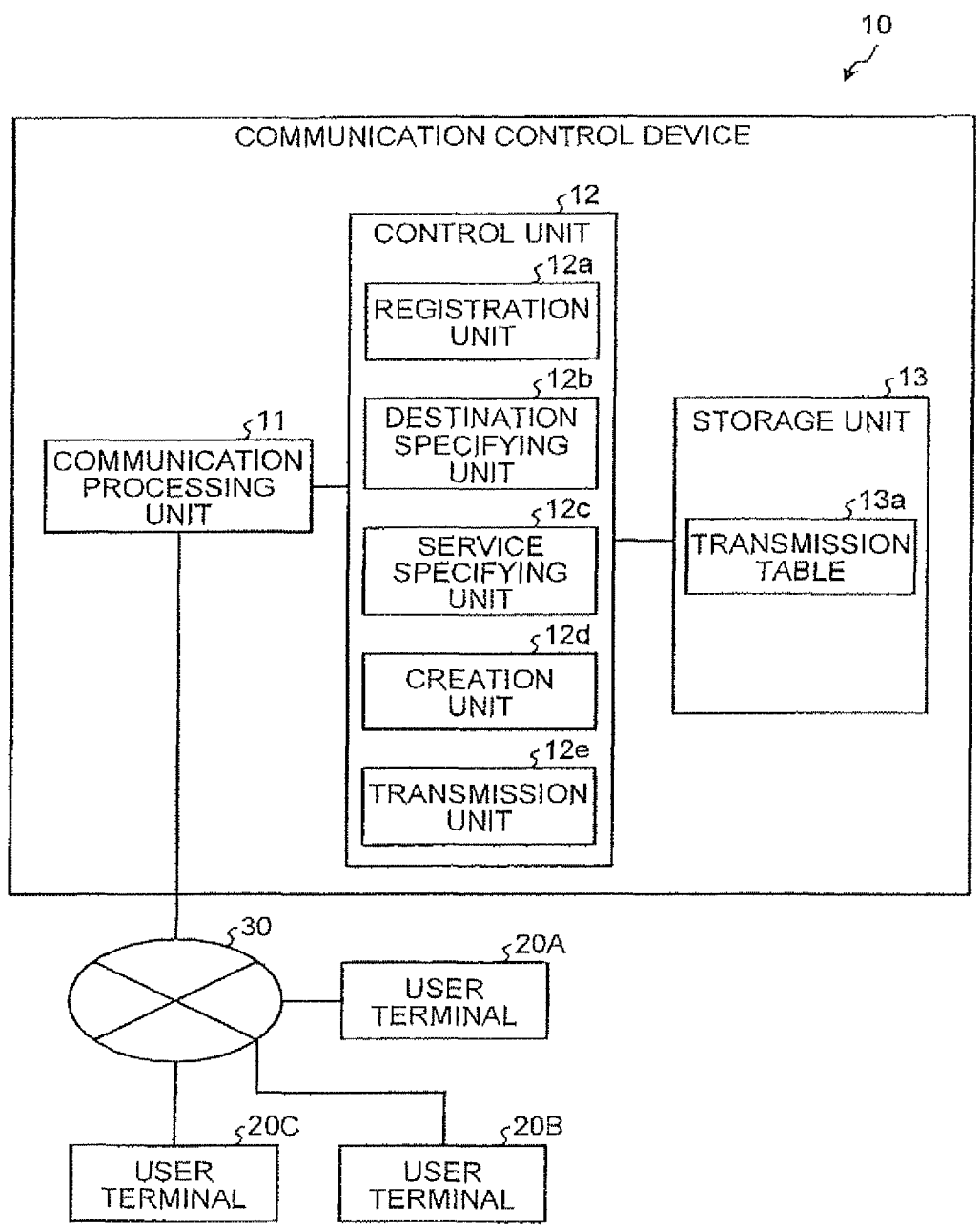
FIG. 1 is a block diagram illustrating the configuration of a communication control device according to a first embodiment.

First, the configuration of a communication control device 10 will be described with reference to FIG. 1. FIG. 1 is a block diagram illustrating the configuration of the communication control device according to the first embodiment. The communication control device 10 includes a communication processing unit 11, a control unit 12, and a storage unit 13. The communication control device 10 is connected to a plurality of user terminals 20A to 20C via a network 30. In the example of FIG. 1, an example is illustrated in which the communication control unit 10 is connected to three user terminals 20A to 20C, but the number of user terminals to be connected is not limited thereto. When it is not necessary to distinguish the plurality of user terminals 20A to 20C from each other in description, the plurality of user terminals 20A to 20C are simply referred to as the "user terminal 20."

The communication processing unit 11 transmits and receives various kinds of data to and from the plurality of user terminals 20A to 20C via the network 30. The communication processing unit 11 corresponds to, for example, a network interface card (NIC). In the following description, a case will be exemplified in which users using the user terminals 20A to 20C have individual accounts of different communication services and perform logging-in from the individual accounts to transmit and receive messages.

Here, the communication services are services that enable messages to communicate between the user accounts and also include social network services that manage connection between users. Specifically, as the communication services, there are services such as Internet mails, short message services, Twitter, Mixi, Ameba, Facebook, and messengers.

The storage unit 13 is, for example, a semiconductor memory element such as a random access memory (Ram), a flash memory, or a storage device such as a hard disk or an optical disc. The storage unit 13 stores data and a program necessary for various processes performed by the control unit 12. The storage unit 13 stores, for example, a transmission table 13a.

Figures 2, 3:
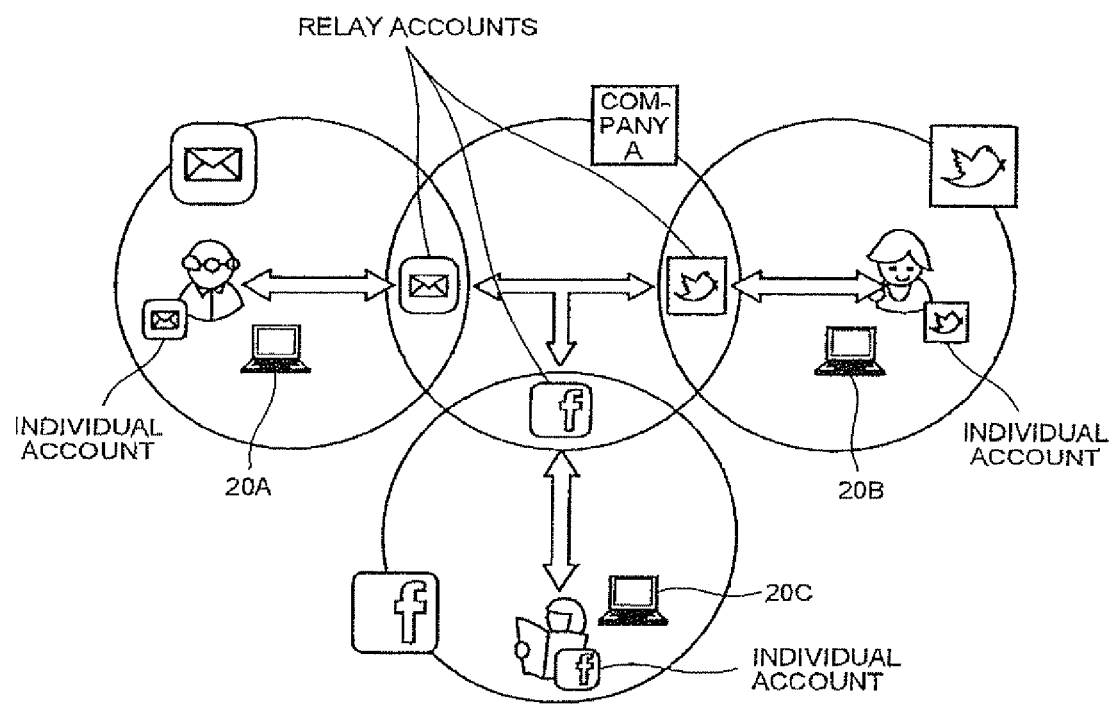
FIG. 2 is a diagram illustrating an example of a transmission table.
FIG. 3 is a diagram illustrating an image used to describe a relation between an own-company relay account and an individual account.

The transmission table 13a stores a destination account of an individual account of each user. FIG. 2 is a diagram illustrating an example of the transmission table 13a. As exemplified in FIG. 2, the transmission table 13a stores a "staff name" which is the name of a user, a "destination account" which is an individual account of the user, and a "service" indicating a type of communication service associated with the individual account in association therewith.

The transmission table 13a exemplified in FIG. 2 stores a destination account "@yahuu_hanako" and a service "t" for a staff name "Yahuu" in association therewith and stores a destination account "morixxxxxxxx@mail.com" and a service "m" for a staff name "Mori" in association therewith. This means that the account "@yahuu_hanako" of the service t is registered with regard to the staff, Yahuu, and the account "morixxxxxxxx@mail.com" and the service m is registered with regard to the staff, Mori.

The control unit 12 includes a registration unit 12a, a destination specifying unit 12b, a service specifying unit 12c, a creation unit 12d, and a transmission unit 12e. The control unit 12 is realized by performing a process according to a computer program stored in advance in a storage device of a CPU, an MPU, or the like.

The registration unit 12a registers accounts of various services as accounts for the communication control device 10 relaying messages in advance in the storage unit 13. Specifically, the registration unit 12a inputs and registers the accounts of the various services in response to operations of a manager in advance. The accounts registered in advance here are relay accounts used to transmit and receive the messages by relaying messages between users. Hereinafter, the accounts are referred to as "relay accounts" or "accounts of company bot."

When the registration unit 12a receives a name, an individual account, and a type of service from a user, the registration unit 12a associates the name of the user and the type of service with each other by using the individual account as a destination account and registers the name of the user, the type of service, and the destination account in the transmission table 13a. Here, each communication service associated with each relay account registered in advance is set as a service which can be registered in the transmission table 13a.

Specifically, the registration unit 12a allows a user to select a desired service from the services which can be registered, and also receives and inputs the individual account and the type of service of a user by transmitting the individual account of the service. In the above-described example of FIG. 2, Yahuu who is a staff selects "t" as a service which the staff desires to use and transmits the individual account "@yahuu_hanako" of the service t to the side of the communication control device 10.

When a service such as Twitter or Facebook having a following function is registered together with a user name and a destination account, the individual account may be transmitted from the relay account of the service to the destination account relevant to the registration, a message requesting following of the relay account may be transmitted, and the following of the relay account may be urged.

Here, a relation between the relay account and the individual account will be described with reference to FIG. 3. FIG. 3 is a diagram illustrating an example of a case in which a company "A" introduces the communication control device 10 according to this embodiment to transmit and receive messages between staffs and is a diagram illustrating an image used to describe the relation between an own company relay account of a company and an individual account of each staff. In the example of FIG. 3, the company A has a relay account corresponding to each of a plurality of services. For example, the company A has the own company account of each of a service "m," a service "f," and a service "t" as the relay account.

In the example of FIG. 3, users are assumed to have accounts of different services. For example, as exemplified in FIG. 3, the staff using the user terminal 20A is assumed to have an individual account of the service "m," the staff using the user terminal 20B is assumed to have an individual account of the service "f," and the staff using the user terminal 20C is assumed to have an individual account of the service "t."

As exemplified in FIG. 3, to transmit messages to the other staffs, each staff logs in the individual account of the service which each user uses and posts messages to the relay accounts (the accounts of company bot) corresponding to the same type of service. A specific process of transmitting the posted message will be described in detail below.

Thus, the registration unit 12a registers the individual accounts which the users usually use. Therefore, for example, when the individual accounts are used in companies, the individual accounts of the communication services which the staffs usually use may be registered for respective staffs, and the companies may not issue staff mail accounts to the respective staffs. For example, when the staffs are retired, only sections of the retired staffs may be deleted from the transmission table.

The destination specifying unit 12b receives a message transmitted from the user terminal 20 and specifies a destination of the message based on the contents of the text of the message. Specifically, for example, the destination specifying unit 12b receives messages destined for the relay account from various service sides via the communication processing unit 11 and determines whether the names stored in the transmission table 13a are registered in opening statements of the texts of the messages. When it is determined that the names are registered, the names written in the opening statements of the texts of the messages are extracted, the individual accounts corresponding to the names are read from the transmission table 13a, and the individual accounts are specified as the destinations.

For example, in the example in which the transmission table 13a is illustrated in FIG. 2, when a message in which "@Asya TO YAHUU, COULD YOU COME TO WORK ON HOLIDAY TOMORROW?" is written is received as a message transmitted from the user terminal 20 to the relay account "@Asya," the destination specifying unit 12b retrieves the name from the opening statement of the text. When the transmission table 13a determines that the staff name "Yahuu" is present, the transmission table 13a specifies the destination account "@yahuu_hanako" corresponding to "Yahuu" as the destination.

Here, the destination specifying unit 12b determines whether the received message is a new message or a reply message when there are a plurality of destination accounts corresponding to the name extracted from the opening statement of the text of the message. Specifically, the destination specifying unit 12b determines whether a reply message format in the corresponding communication service is satisfied as a method of determining whether the received message is a new message or a reply message.

For example, when there are a plurality of users with the name "Mori" and the names "Taro Mori" and "Jiro Mori" are registered in the transmission table 13a and when "To MORI" is written in the text of a received message, there are the plurality of corresponding names. In this case, the destination specifying unit 12b determines whether the message is a new message or a reply message to a previous transmitted message.

As a result, when determining that the message is a new message, the destination specifying unit 12b transmits a message used to designate a destination to the account which is a sender of the new message and specifies the destination according to a reply to the message. For example, the destination specifying unit 12b writes information (full name or a department and an age) regarding each of the users with the same name as the name extracted from the opening statement of the text of the received message and transmits the message with a text of the contents for selecting whether the mail is a mail transmitted to one user as the message used to designate the destination. Specifically, as a specific example, the destination specifying unit 12b transmits a message with a text "1. TARO MORI: DEPARTMENT OF GENERAL AFFAIRS 32 YEARS OLD, 2. JIRO MORI: DEPARTMENT OF SALES 27 YEARS OLD, PLEASE SELECT EITHER NUMBER AND TRANSMIT MESSAGE" and determines a destination according to the number replied to the message.

When determining that the message is a reply message, the destination specifying unit 12b sets the account of the sender of the immediately previous message of the reply message as the destination. That is, since the reply message is a reply to the immediately previously arrived message, the account of the sender of the immediately previous message is specified as the destination account.

The service specifying unit 12c specifies a type of communication service available by the user of the destination specified by the destination specifying unit 12b. Specifically, the service specifying unit 12c reads a "service" associated with the "destination account" specified by the destination specifying unit 12b with reference to the transmission table 13a and specifies the service.

The creation unit 12d converts the format of the received message into a format suitable for the type of service specified by the service specifying unit 12c Specifically, the creation unit 12d converts the format of the transmitted message destined for the relay account into a format suitable for the type of the service specified by the service specifying unit 12c, that is, the type of service corresponding to the destination account of the destination.

For example, when the received message destined for the relay account of the service "m" is transmitted to the destination account of the service "t," the creation unit 12d extracts the text of the received message destined for the relay account of the service "m" and creates a message for the service t to which information such as temporal information submitted to the extracted text of the message is added.

The creation unit 12d may specify the name of the sender from the account of the sender of the received message with reference to the transmission table 13a and add the name of the sender to the opening statement of the text of the message to be transmitted. For example, when the received message in which the sender is "Mori" is transmitted to the destination account "@yahuu," the creation unit 12d adds "SENDER MORI" to the text of the message and creates a message "@yahuu SENDER MORI: TO YAHUU, COULD YOU COME TO WORK ON HOLIDAY TOMORROW?"

The transmission unit 12e transmits the message converted by the creation unit 12d to the destination specified by the destination specifying unit 12b. Specifically, the transmission unit 12e transmits the message from the relay account of the service to the destination account, using the service of the destination account.

Figure 4:
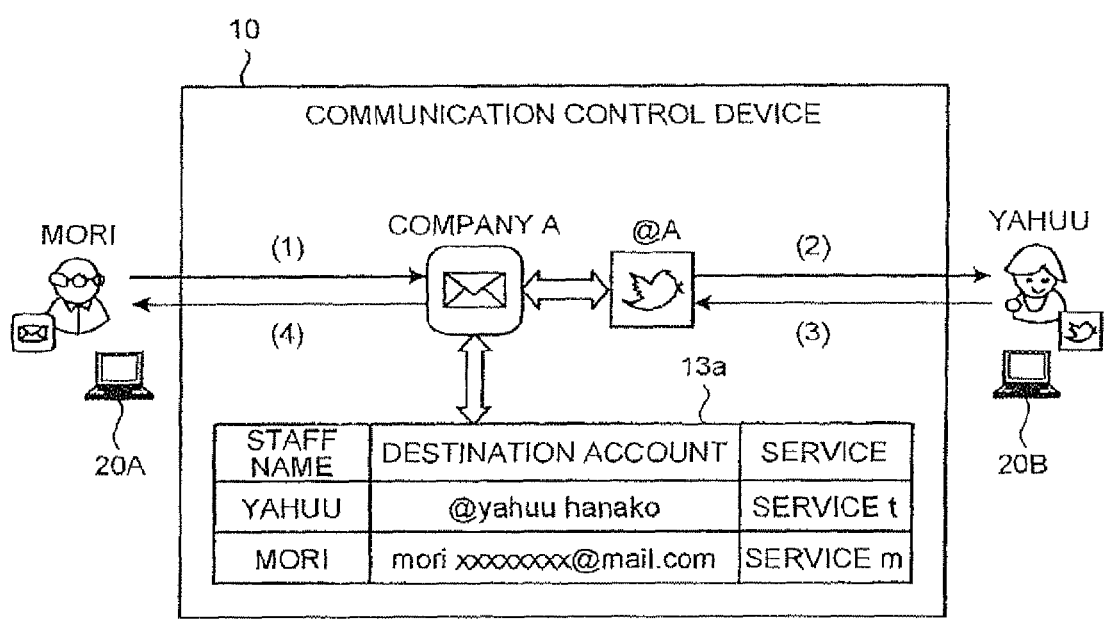
FIG. 4 is a diagram illustrating a message transmission process between different services.

Here, a message transmission process between different services will be described with reference to an example of FIG. 4. FIG. 4 is a diagram illustrating an example of the message transmission process between different services. As illustrated in FIG. 4, the communication control device 10 according to this embodiment is introduced by the company "A." When "Mori" using the user terminal 20A sends a message to "Yahuu" using the user terminal 20B, "Mori" logs in the account of the service m and transmits a message in which the name "Yahuu" is written in an opening statement of a text to the relay account of the service m of the company A, using the service m (see (1) of FIG. 4).

Next, the communication control device ID extracts "Yahuu" as a staff name from the opening statement of the text of the received message based on the transmission table 13a, acquires the destination account "@yahuu hanako" for "Yahuu," specifies the destination, and specifies that the service corresponding to "Yahuu" is "t," that is, the type of service of the account available by Yahuu is "t." Then, the communication control device 10 creates a message with a format suitable for the service "t" from the message received from Mori and transmits the message from the relay account of the service t of the company A to the account of the service t used by Yahuu (see (2) of FIG. 4).

When Yahuu using the user terminal 20B replies the message to Mori, a message in which the destination name such, as "TO MORI" is included in the opening statement of the text is replied to the message transmitted from the relay account of the service t of the company A and sent from Mori (see (3) of FIG. 4).

Next, when the communication control device 10 receives the replied message, the communication control device 10 extracts "MORI" in the opening statement of the text of the message as the destination based on the transmission table 13a, acquires the destination account "morixxxxxxxx@mail.com" for "MORI," specifies the destination, and specifies the service "m" corresponding to "MORI," that is, that the type of service of the account which Mori has is "m." Then, the communication control device 10 creates a message with a format suitable for the service "m" from the message received from Yahuu and transmits the message from the relay account of the service m of the company A to the account of the service in which Mori uses (see (4) of FIG. 4).

Figure 5:
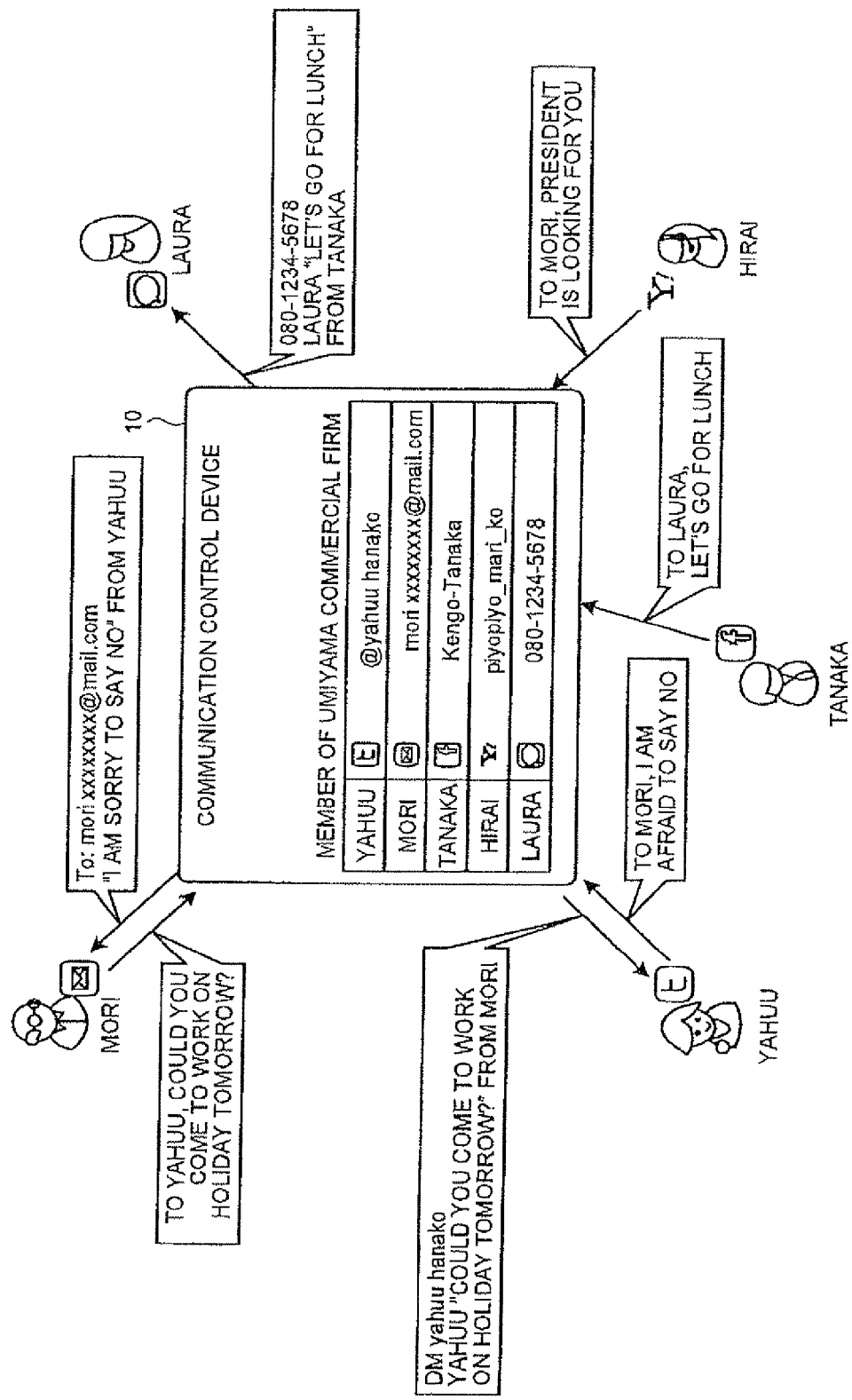
FIG. 5 is a diagram illustrating an overview of a message transmission process performed by the communication control device according to the first embodiment.

Thus, the communication control device 10 can transmit and receive a message for communication within a company using an individual account, while the individual account of the communication service which a staff usually uses is not opened to other staffs of the company so as to be kept secret. Here, with reference to FIG. 5, a process of transmitting a message for communication within a company will be described while an individual account is not opened to the company so as to be kept secret. FIG. 5 is a diagram illustrating an overview of the message transmission process performed by the communication control device 10 according to the first embodiment.

As exemplified in FIG. 5, for example, when Mori sends a message "TO YAHUU, COULD YOU COME TO WORK ON HOLIDAY TOMORROW?" to Yahuu, the message is transmitted from the individual account of the E-mail to the relay account.

Next, the communication control device 10 extracts the name "Yahuu" written in the opening statement of the text of the message of the E-mail and transmits a message "COULD YOU COME TO WORK ON HOLIDAY TOMORROW?" from Mori" from the relay account to the individual account "@yahuu hanako" for "Yahuu." Then, Yahuu can receive the message sent from Mori from the individual account.

Therefore, in the example of FIG. 5, the message can be transmitted to Yahuu although Mori sending the message does not know the individual account of Yahuu. As a result, the message for communication within the company can be transmitted and received, while the individual account of the service which Yahuu usually uses is not opened to the company so as to be kept secret.

Process Performed by Communication Control Device

Figure 6:
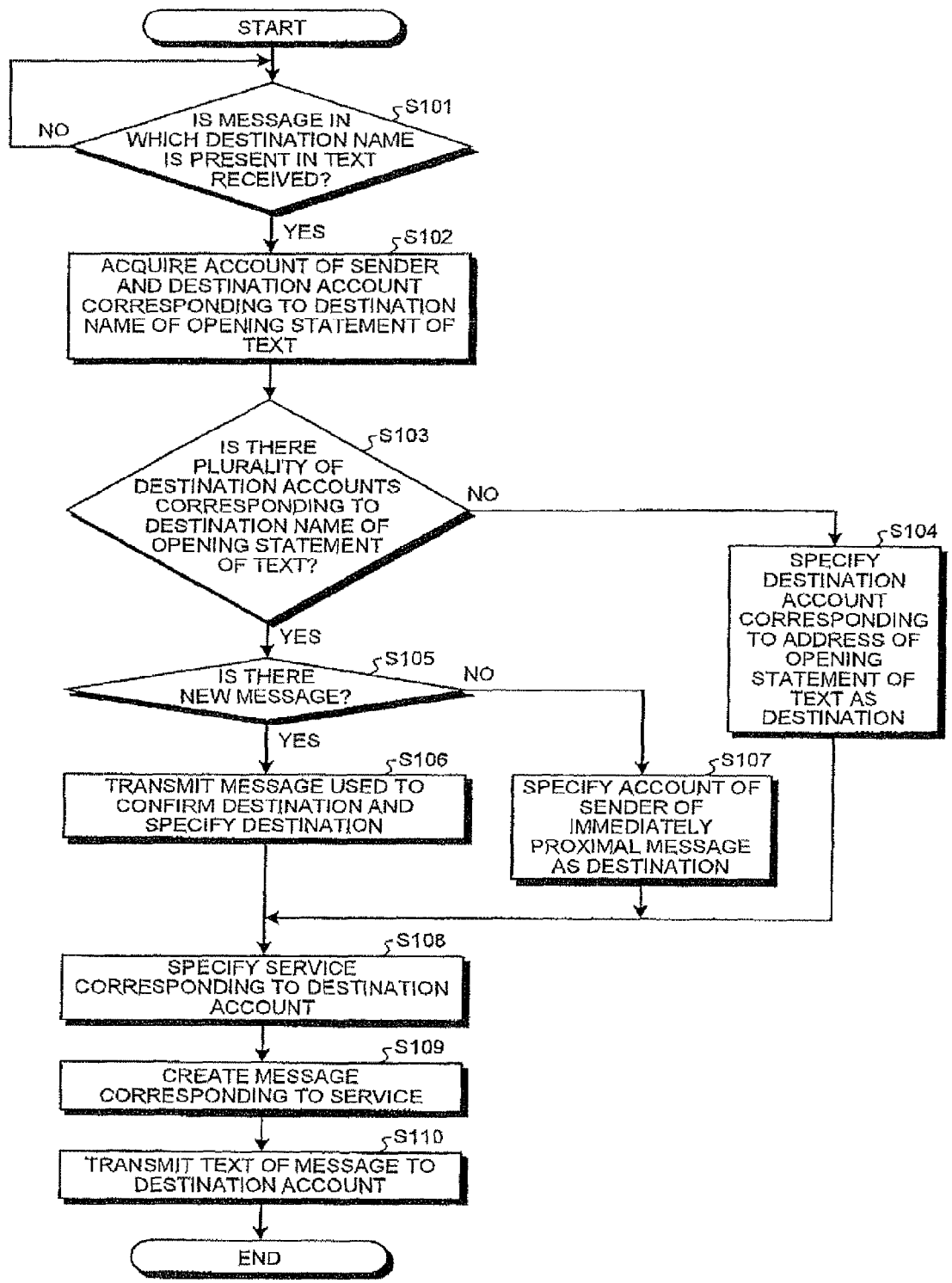
FIG. 6 is a flowchart illustrating a process of the communication control device according to the first embodiment.

Next, a process performed by the communication control device 10 according to the first embodiment will be described with reference to FIG. 6. FIG. 6 is a flowchart illustrating the process of the communication control device according to the first embodiment.

As illustrated in FIG. 6, when the destination specifying unit 12b of the communication control device 10 receives the message transmitted to the relay account, the destination specifying unit 12b determines whether the destination name stored in the transmission table 13a is present in the text of the message. When it is determined that the destination name is present (Yes in step S101), the account of the sender of the message and the destination account corresponding to an address of the opening statement of the text of the message are acquired (step S102). Specifically, the destination specifying unit 12b extracts the account of the sender of the message and extracts the destination name written in the opening statement of the text of the message, and then reads the individual account corresponding to the destination name from the transmission table 13a.

The destination specifying unit 12b determines whether there are a plurality of destination names corresponding to the address of the opening statement of the text of the message in the transmission table 13a (step S10). As a result, when the destination specifying unit 12b determines that there are no plurality of destination names (No in step S103), the destination specifying unit 12b specifies the destination account of the destination name corresponding to the address of the opening statement of the text of the message as the destination (step S104).

Conversely, when the destination specifying unit 12b determines that there is the plurality of corresponding destination names (Yes in step S103), the destination specifying unit 12b determines whether the received message is a new message (step S105). As a result, when the destination specifying unit 12b determines that the received message is the new message (Yes in step S105), the destination specifying unit 12b transmits the message used to designate the destination to the user terminal 20 transmitting the new message and specifies the destination according to a reply message to the message (step S106). For example, the destination specifying unit 12b transmits, as the message used to designate the destination, a message including information (a department or an age) regarding each user corresponding to the name extracted from the opening statement of the text of the message and a text in which contents configured to select whether the message is a message transmitted to one user and urging a reply to the selection result, and then specifies the destination according to the contents of the replied message.

Conversely, when the destination specifying unit 12b determines that the received message is not the new message, that is, determines that the received message is the reply message to the previous transmitted message (No in step S105), the destination specifying unit 12b specifies the account of the sender of the immediately proximal message corresponding to the reply message as the destination (step S107). That is, the destination specifying unit 12b specifies the account of the sender of the immediately previous message as the destination account by considering the reply message as the reply to the immediately previous message. The destination specifying unit 12b may specify the account of the sender of the message most recently transmitted to the sender of the reply message as the destination account of the reply message.

The service specifying unit 12c specifies a communication service relevant to use of the user of the destination specified by the destination specifying unit 12b (step S108). Specifically, the service specifying unit 12c reads a "service" associated with the "destination account" specified by the destination specifying unit 12b with reference to the transmission table 13a and specifies the communication service.

Next, the creation unit 12d converts the format of the received message into a format suitable for the type of communication service according to the type of communication service specified by the service specifying unit 12c (step S109). Specifically, the creation unit 12d converts the format of the message transmitted to the relay account into a format suitable for the type of communication service specified by the service specifying unit 12c, that is, the type of service corresponding to the destination account of the destination.

The transmission unit 12e transmits the message created by the creation unit 12d to the destination specified by the destination specifying unit 12b (step S110). Specifically, the transmission unit 12e transmits the message to the destination account by using the communication service of the destination account.

Advantages of First Embodiment

As described above, when the communication control device 10 receives a message transmitted from the user terminal 20, the communication control device 10 specifies the destination of the message based on the contents of the message, specifies a type of communication service available by the user of the specified destination, and converts the format of the message into a format suitable for the specified type of communication service. Then, the communication control device 10 transmits the converted message to the specified destination. Thus, the communication control device 10 can transmit and receive the message, while appropriately keeping the individual accounts secret mutually between the users using different communication services.

According to the first embodiment, the communication control device 10 includes the transmission table 13a that stores the names of the users, the individual accounts which the users have, and the types of communication services available by the users in association therewith. The communication control device 10 extracts the name written in the opening statement of the text of the message, reads the individual account corresponding to the name from the transmission table 13a, specifies the individual account as the destination, reads the type of service corresponding to the specified individual account from the transmission table 13a, and specifies the type of service as the type of communication service available by the user. Therefore, the communication control device 10 can specify the individual account and the type of service, when the name serving as the destination is merely written in the opening statement of the text of the message. Therefore, the communication control device 10 can transmit and receive the message, while keeping the individual account secret appropriately and simply between the users using the different services.

According to the first embodiment, when there is the plurality of individual accounts corresponding to the name, the communication control device 10 determines whether the received message is a new message or a reply message. When the communication control device 10 determines that the received message is the new message, the communication control device 10 transmits the message used to confirm the destination to the user terminal transmitting the new message. Conversely, when the communication control device 10 determines that the received message is the reply message, the communication control device 10 specifies the account of the immediately previous message as the destination. Therefore, the communication control device 10 can appropriately specify the destination, even when there is the plurality of candidates of the destination.

According to the first embodiment, the communication control device 10 registers the account of each service as the relay account used to relay a message in advance. Then, the communication control device 10 receives the message transmitted to the registered relay account and specifies the destination of the message based on the contents of the message. Therefore, the communication control device 10 can receive messages from the users using various services by registering the relay accounts relaying the messages in advance for the accounts of the respective services, and thus can transmit the messages while appropriately keeping the individual accounts secret.

Hitherto, one of the embodiments of the present disclosure has been described in detail with reference to the drawings, but the embodiment is merely an example. Based on the knowledge of those skilled in the art, various modifications and improvements can be made to realize other embodiments from the aspects in the summary of the invention.

The case has been described above in which the above-described communication control device 10 transmits a message to the destination account corresponding to the name of the opening statement of the text of the message, but the invention is not limited thereto. For example, the communication control device 10 may be configured to transmit a message to a destination account corresponding to a name parenthesized in the text of the message or may be configured to transmit a message to a destination account corresponding to a name written with thick characters in the text of the message.

The above-described communication control device 10 may be realized by a plurality of server computers, or the configuration may be flexibly changed so as to be realized, for example, by calling an external platform or the like with an API (Application Programming Interface), network computing, or the like depending on a function.

"Units" described in the claims can be substituted with "portions (sections and modules) or "circuits." For example, a destination specifying unit can be replaced with a destination specifying section or a destination specifying circuit.

In the communication control device, the message transmission method, and the message transmission program according to the present disclosure, it is possible to obtain the advantage of transmitting and receiving messages while appropriately keeping individual accounts secret between users using different services.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication control device comprising:
 a memory configured to store:
  an account of each of a plurality of communication services as a relay account used to relay a message; and
  a name of a user, a type of communication service available to the user, and an individual account of the user corresponding to the type of communication service available to the user in association with each other; and
 a processor coupled to the memory and configured to:
  receive a message transmitted from a user terminal to a stored relay account;
  extract the name of the user stored in the memory from a sentence written in an opening statement of a text of the received message;
  determine whether the received message is a new message or a reply message to a previously transmitted message, when the name extracted from the text of the received message corresponds to a plurality of names stored in the memory;
  transmit a confirmation message used to designate a destination to the user terminal, read the individual account corresponding to the name from the memory, and specify the individual account as the destination, when the received message is determined to be the new message;
  specify an individual account of the sender of the previously transmitted message as the destination, when the received message is determined to be the reply message to the previously transmitted message;
  read the type of communication service associated with the specified destination from the memory;
  specify the type of communication service as the type of service available to the user;
  convert a format of the received message into a format suitable for the specified type of communication service;
  transmit the converted message to the specified destination; and
  enable the user of the specified destination to reply to the user terminal by transmitting a reply message from the stored relay account to the user terminal.

2. A message transmission method performed by a computer, comprising:
- storing an account of each of a plurality of communication services as a relay account used to relay a message;
- storing a name of a user, a type of communication service available to the user, and an individual account of the user corresponding to the type of communication service available to the user in association with each other;
- receiving a message transmitted from a user terminal to a stored relay account;
- extracting the name of the user stored in the memory from a sentence written in an opening statement of a text of the received message;
- determining whether the received message is a new message or a reply message to a previously transmitted message, when the name extracted from the text of the received message corresponds to a plurality of names stored in the memory;
- transmitting a confirmation message used to designate a destination to the user terminal, reading the individual account corresponding to the name from the memory, and specifying the individual account as the destination, when the received message is determined to be the new message;
- specifying an individual account of the sender of the previously transmitted message as the destination, when the received message is determined to be the reply message to the previously transmitted message;
- reading the type of communication service associated with the specified individual account from the memory;
- specifying the type of communication service as the type of service available to the user;
- converting a format of the received message into a format suitable for the type of communication service specified in the specifying of the type of communication service;
- transmitting the message converted in the converting of the format to the destination specified in the specifying of the destination; and
- enabling a user of the destination specified in the specifying of the destination to reply to the user terminal by transmitting a reply message from the stored relay account to the user terminal.

3. A non-transitory computer readable storage medium having stored therein a message transmission program causing a computer to execute a process, the process comprising:
- a storing procedure for storing an account of each of a plurality of communication services as a relay account used to relay a message and for storing a name of a user, a type of communication service available to the user, and an individual account of the user corresponding to the type of communication service available to the user in association with each other;
- a destination specifying procedure for receiving a message transmitted from a user terminal to a stored relay account, extracting the name of the user stored in the memory from a sentence written in an opening statement of a text of the received message, and determining whether the received message is a new message or a reply message to a previously transmitted message, when the name extracted from the text of the received message corresponds to a plurality of names stored in the memory;
- a destination specifying procedure for transmitting a confirmation message used to designate a destination to the user terminal, reading the individual account corresponding to the name from the memory, and specifying the individual account as the destination, when the received message is determined to be the new message;
- a destination specifying procedure for specifying an individual account of the sender of the previously transmitted message as the destination, when the received message is determined to be the reply message to the previously transmitted message;
- a service specifying procedure for reading the type of communication service associated with the specified individual account from the memory, and specifying the type of communication service as the type of service available to the user;
- a creation procedure for converting a format of the received message into a format suitable for the type of communication service specified in the service specifying procedure; and
- a transmission procedure for transmitting the message converted in the creation procedure to the destination specified in the destination specifying procedure and enabling the user of the destination specified by the destination specifying procedure to reply to the user terminal by transmitting a reply message from the stored relay account to the user terminal.

* * * * *